Patented Aug. 24, 1954

2,687,370

UNITED STATES PATENT OFFICE 2,687,370

CONVERSION OF HYDROCARBONS WITH NICKEL OXIDE-MOLYBDENUM OXIDE CATALYST

Grant W. Hendricks, Brea, Calif., assignor to Union Oil Company of California, Los Angeles, Calif., a corporation of California No Drawing. Application August 27, 1951, Serial No. 243,913

5 Claims. (Cl. 196—28)

This invention relates generally to catalysts and to catalytic processes for the conversion of hydrocarbons and hydrocarbon mixtures. More particularly, this invention relates to a new and improved method for a preperation of catalysts comprising nickel and molybdenum oxides supported on carriers and to methods for using such catalysts.

Supported catalysts containing nickel and molybdenum were disclosed in U. S. Patent 2,393,288 to A. C. Burns. The catalysts described therein were prepared by the coprecipitation of nickel and molybdenum oxides in molecular combination as nickel molybdate either alone or in the presence of a suitable carrier such as alumina. The preparation of a supported coimpregnated nickel-molybdate catalyst was disclosed in U. S. Patent 2,486,361 to P. G. Nahin et al.

It has now been found that an improved nickel-molybdenum catalyst supported on a carrier can be prepared by a two-stage impregnation process described herein and that catalysts prepared by this new method are easier to prepare, possess superior activity and have other desirable features and properties. This application is related to my co-pending application Serial No. 88,046, filed April 16, 1949, which discloses and claims cobalt-molybdenum catalysts corresponding to the herein claimed nickel catalyst.

It is an object of this invention to simplify the preparation of supported nickel-molybdenum-containing catalysts and to improve the catalytic activity of such catalysts.

It is a further object of this invention to provide a method for the preparation of supported nickel-molybdenum-containing catalysts, which method affords greater control of the final catalytic composition during the preparation and manufacture.

It is another object of this invention to provide a new supported catalyst and to provide method for the use thereof for hydrocarbon conversion processes such as desulfurization, denitrogenation, hydrogenation, hydroforming and the like.

Briefly, this invention relates to the preparation of a supported nickel oxide-molybdenum oxide catalyst which is prepared by the impregnation of the carrier in two separate and distinct steps. In the preferred modification of the invention a suitable carrier, e. g. activated alumina, alumina-silica, titania or the like, is first immersed in an aqueous solution of a soluble molybdenum-containing salt, such as for example, an ammoniacal ammonium molybdate solution. The impregnated carrier is drained of the excess solution, dried and heated to a temperature sufficient to decompose or oxidize the molybdenum-containing salt to molybdic oxide. The carrier supporting the molybdic oxide is thereafter immersed in an aqueous solution of a soluble nickel-containing salt, such as for example, aqueous nickelous nitrate. The reimpregnated carrier is drained of the excess solution, dried, and heated to a temperature sufficient to decompose or oxidize the nickel-containing salt to nickel oxide. The resulting catalyst may be employed for various hydrocarbon conversions described hereinafter such as desulfurization, denitrogenation, hydrogenation, hydroforming and the like.

In another modification of the invention the absorbent carrier is first immersed in an aqueous solution of a nickel compound such as nickel nitrate. The impregnated carrier is drained of the excess solution, dried, and heated to a temperature sufficient to decompose or oxidize the nickel compound to nickel oxide. The carrier supporting the nickel oxide is thereafter immersed in an aqueous solution of a soluble molybdenum-containing compound, e. g. ammoniacal ammonium molybdate solution. The impregnated carrier is drained of the excess solution, dried, and heated to a temperature sufficient to decompose or oxidize the molybdenum compound to molybdenum oxide.

The carriers which are suitable and may be employed for distending the mixture of nickel and molybdenum oxides according to the process in this invention comprise alumina, silica, zirconia, thoria, magnesia, magnesium hydroxide, titania or any combination of these. The preferred carrier is activated, gel-type alumina and particularly alumina gel containing about 3 to 8% of silica. The presence of the small amount of silica in the alumina serves to stabilize the resulting catalyst and prolongs the catalyst life as is described in U. S. Patent 2,437,532 to H. C. Huffman.

The carrier is normally shaped into the physical form desired for the catalyst prior to the impregnation steps. For this purpose the dried carrier is usually ground, mixed with a lubricant such as graphite or hydrogenated vegetable oil, and pilled. In the activation of the carrier the lubricant is removed by combustion. Alternatively, the carrier may be used in granular form or ground into powder and extruded. Where the catalyst is to be employed in a fluidized process, such as in fluidized desulfurization, denitrogenation, and the like, the carrier is formed into a finely divided state or is ground into a fine state and thereafter impregnated. In the case of fluidized processes, the carrier can be impregnated in larger form, e. g. granules, pills, etc., and thereafter ground to the desired powder size for the processing.

The molybdenum-containing impregnation solution is preferably ammoniacal ammonium molybdate although aqueous solutions of other soluble molybdenum compounds may be employed. In the preferred method, ammonium paramolybdate is dissolved in about 14% aqueous ammonia and the resulting mixture is diluted with distilled water or with more diluted aqueous ammonia to form a clear ammonium molybdate solution of the desired concentration. The concentration of the ammonium molybdate solution will depend on the particular carrier being employed and on the desired concentration of molybdenum in the finished catalyst. Where alumina or alumina-silica carriers are employed, and a finished catalyst comprising between about 6 to 16% of $MoO_3$ is desired, the molybdenum-containing impregnation solutions will have a concentration of molybdenum ranging from about 12 to 32 g. of $MoO_3$/100 ml.

The nickel-containing impregnation solution is preferably an aqueous solution of nickelous nitrate although other water-soluble compounds of nickel may be employed. Thus nickel chloride, for example, may be employed in the impregnation solutions although it is more difficultly decomposed to an active form and requires both heat and oxidation to complete the conversion to the oxide. Other water-soluble salts of nickel may be employed, such as nickel acetate, and the like. The concentration of the nickel-containing impregnation solution will depend upon the carrier being employed and the desired concentration of nickel in the finished catalyst. Where alumina or alumina-silica carriers are employed and where a final catalyst composition containing from about 2 to 10% by weight of NiO is desired, the concentration of the nickel impregnation solution will range from about 4 to 23 g. of NiO/100 ml.

In the preparation of the catalyst the carrier is first activated by heating in order to render it sufficiently absorbent to be impregnated. Such activation may, for example, be effected by heating for 2 to 6 hours at about 300° to 600° C. The carrier is then cooled and immersed in the molybdenum-containing impregnation solution of the type described hereinbefore. The impregnation solution is absorbed by the carrier and the excess impregnation solution is thereafter removed. The impregnated carrier is drained and dried in a low temperature oven to remove the bulk of the water. Following the drying at, for example, 90° to 110° C., the mixture is activated by heating it to a temperature of, for example, 400° to 600° C., for 2 to 6 hours in order to decompose the molybdenum salt to $MoO_3$.

The carrier supporting the molybdic oxide is then cooled and immersed in the nickel-containing impregnation solution of the type described hereinbefore, to absorb the nickel-containing solution. The excess solution is again removed and the impregnated material is drained and dried at low temperature, for example 90° to 110° C. The material is again activated by heating at, for example, 400° to 600° C. for 2 to 6 hours in order to decompose the nickel-containing compound to nickel oxide. The finished catalyst prepared by this method is usually reduced in the presence of hydrogen at a temperature between 700° and 1100° F. prior to its use.

In an alternative method of catalyst impregnation the order of impregnation is reversed. The absorbent carrier is first immersed in the nickel-containing impregnation solution, heated to decompose or oxidize the nickel compound to nickel oxide, and the nickel oxide containing carrier is thereafter impregnated with the molybdenum-containing impregnation solution.

The finished catalysts are useful for effecting various hydrocarbon conversion reactions such as desulfurization, denitrogenation, hydrogenation, hydroforming, reforming, cracking, destructive hydrogenation, and the like. During usage varying amounts of deposits comprising mostly carbon, nitrogen and sulfur compounds accumulate on the catalyst and these are periodically removed by regeneration. Regeneration is effected by passing air diluted wih flue gas, steam, nitrogen or other inert gas over the catalyst to combust the deposits while maintaining the temperature of the catalyst between 800° and 1100° F. The combustion is completed in the presence of undiluted air while maintaining the temperature of the catalyst between 800° and 1100° F. The regenerated catalyst after reduction with hydrogen has practically the same catalytic activity as the freshly prepared catalyst even after a large number of regenerations.

For the purpose of desulfurizing petroleum stocks, shale distillates and the like, the catalyst of this invention is employed under the following conditions: reaction temperatures between about 600° to 1000° F., pressures between about atmospheric to 5000 lbs. per sq. in. or more, and at space velocities between about 0.2 and 25.0 volumes of liquid feed stock per volume of catalyst per hour, and 500 to 10,000 cu. ft. of added hydrogen per barrel of feed. The particular set of conditions is determined by the stock to be desulfurized and by the nature of the product desired.

The catalyst in this invention can also be employed for denitrogenation of such stocks as coal tar distillates, shale oils and heavy petroleum distillates whereby up to 99% of the nitrogen and substantially 100% of the sulfur can be removed simultaneously. For denitrogenation of such stocks the following conditions are employed: reaction temperatures between about 700° and 1000° F., pressures between about 500 and 10,000 lbs. per sq. in., feed rates between about 0.2 and 10.0 volumes of liquid feed stock per volume of catalyst per hour, and about 1,000 to 10,000 cu. ft. of added hydrogen per barrel of feed. For the removal of nitrogen it is generally desirable to employ a two-stage denitrogenation process wherein the ammonia synthesized in the first stage is removed from the first-stage product prior to its entry into the second stage denitrogenation and wherein the ammonia and hydrogen sulfide are removed from the recycle hydrogen gas streams in each stage. Under these conditions the maximum efficiency for removing nitrogen from the stocks is obtained.

The catalyst of this invention may also be employed for the process generally termed "hydroforming," which process serves to reform a gasoline range hydrocarbon stock and increase its aromatic content. For processing stocks for the purpose of reforming and increasing their aromaticity, the following conditions are employed: reaction temperatures between about 800° to 1200° F., pressures between about 50 to 1000 lbs. per sq. in., space velocities between about 0.2 and 4.0 volumes of liquid feed stock per volume of catalyst per hour, and about 1,000 to 10,000 cu. ft. of added hydrogen per barrel of feed. The specific conditions are determined by the nature of the specific feed stock employed and the quality of the product desired.

Although other compositions can be prepared by the method of this invention, catalysts conatining from about 7 to 22% by weight and preferably from about 10 to 16% by weight of nickel plus molybdenum oxides are employed. It is preferable that the molecular ratio of nickel oxide to molybdic oxide ($NiO/MoO_3$) be between about 0.2 and 5.0 for best results. Within these limits the preferred catalysts will contain between about 2 to 15% by weight of $MoO_3$ and between about 0.5 to 12% by weight of NiO.

Perhaps the process of this invention is best illustrated by the following specific examples.

Example I

An alumina-silica gel containing an estimated 95% $Al_2O_3$ and 5% $SiO_2$ was prepared by the co-precipitation of an aqueous mixture of sodium aluminate and sodium silicate with carbon dioxide. The precipitate was washed until substantially free of sodium ions, dried at 90–110° C. and activated by heating for two hours at 600° C. A solution of ammonium molybdate was prepared by dissolving about 1700 parts by weight of ammonium paramolybdate, assaying about 81% by weight of $MoO_3$, in about 1940 parts by weight of 28% aqueous ammonia and about 1550 parts by weight of distilled water. About 4400 parts by weight of the activated gel were immersed in the ammoniacal solution of ammonium molybdate, drained, dried and heated at 600° C. for about two hours. An aqueous solution of nickel nitrate was prepared by dissolving about 2150 parts by weight of nickel nitrate hexahydrate in about 2000 parts by weight of water. The carrier supporting the molybdic oxide was then immersed in the nickel nitrate solution, drained, dried and activated by heating to 600° C. for two hours. The catalyst prepared by this method contained about 9.1% $MoO_3$ and 4.4% NiO. The atomic ratio of Ni/Mo was about 0.93.

At the beginning of a run the catalyst is reduced at atmospheric pressure with hydrogen while controlling the rate to maintain the temperature below 1050° F., after which time reduction is completed under pressure, such as at the reaction pressure to be employed. While continuing the hydrogen flow through the catalyst the preheated feed stock is started through the catalyst bed and continued at the desired feed rate measured in terms of volumes of liquid feed stock per volume of catalyst per hour (also referred to herein as V/V) and for the desired number of hours, after which time the hydrogen addition is continued for a short while in order to purge the catalyst of products.

The liquid product is cooled under pressure, withdrawn and washed with both caustic and water in order to remove any hydrogen sulfide and ammonia. The washed and dried product is thereafter analyzed.

Employing the aforedescribed procedure a run was made with an educted shale oil distillate having the following characteristics:

Gravity, °A. P. I. at 60° F. _____ 27.2
Nitrogen, wieght per cent _____ 1.72
Sulfur, weight per cent _____ 0.74

The run was made with a hydrogen pressure of 1100 lbs. per sq. in. gauge and at a catalyst bed temperature of about 770° F. The added hydrogen was maintained at about 4,000 cu. ft. per barrel of feed employing fresh non-recycled once-through hydrogen. The following data were obtained for a 24-hour process period:

Product analysis:
   Nitrogen, weight per cent _____ 0.45
   Sulfur, weight per cent _____ 0.15
Hydrogen consumption, cu. ft./bbl. of feed __ 900

Example II

When titania gel is substituted for the alumina-silica gel in the catalyst preparation and processing described in Example I, substantially the same favorable results are obtained.

Example III

A series of impregnated catalysts are prepared by three different impregnation procedures. Catalyst 1 is a coimpregnated catalyst prepared according to the general method of Nahin et al.

In the preparation of catalyst 1 an ammoniacal ammonium molybdate solution was prepared by dissolving 129 parts by weight of ammonium paramolybdate in a mixture of 190 parts by weight of 28% aqueous ammonia and 123 parts by weight of distilled water. A nickel-containing solution was prepared by dissolving 225 parts by weight of nickelous nitrate hexahydrate in 65 parts by weight of distilled water. The nickel-containing solution is added slowly and dropwise into the molybdenum solution while rapidly stirring the molybdenum solution. A coprecipitated carrier containing about 95% by weight of alumina and about 5% by weight of silica was activated by heating for six hours at 600° C. About 420 parts by weight of the activated carrier were immersed in the mixed solution for one hour, drained of the excess solution, dried overnight at 90° to 110° C. and finally heated for two hours at 600° C.

Catalysts 2 and 3 were prepared by separately impregnating nickel and molybdenum in two impregnation stages, with the nickel being deposited first and the molybdenum second in the case of catalyst 2, and with the molybdenum being deposited first and the nickel second in the case of catalyst 3.

Catalyst 2 was prepared as follows: About 420 parts by weight of the activated alumina-silica carrier were immersed in an aqueous nickelous nitrate solution prepared by dissolving 155 parts by weight of nickelous nitrate hexahydrate in about 415 parts by weight of distilled water. The impregnated carrier was drained, dried and calcined for two hours at 600° C. The carrier supporting the nickel oxide was then immersed in an ammoniacal ammonium molybdate solution prepared by dissolving 104 parts by weight of ammonium paramolybdate in a mixture of about 225 parts by weight of 28% aqueous ammonia and about 208 parts by weight of distilled water. The impregnated mixture was drained of the excess solution, dried and activated by heating for two hours at 600° C.

Catalyst 3 was prepared as follows: About 420 parts by weight of the activated alumina-silica carrier were immersed in an ammoniacal ammonium molybdate solution prepared by dissolving about 104 parts by weight of ammonium paramolybdate in a mixture of about 225 parts by weight of 28% aqueous ammonium hydroxide and about 233 parts by weight of distilled water. The impregnated carrier was drained of the excess solution, dried and calcined for two hours at 600° C. The carrier supporting the molybdic oxide was thereafter immersed in an aqueous solution of nickelous nitrate prepared by dissolving about 155 parts by weight of nickelous nitrate hexahydrate in about 390 parts by weight of distilled water. The impregnated carrier was drained of the excess solution, dried and activated by heating for two hours at 600° C.

The three catalysts are separately reduced and employed for desulfurizing of a straight run gas oil distillate from a Santa Maria Valley crude oil. The gas oil feed stock contained 2.33% by weight of sulfur and had a 33.2 API gravity. The following operation conditions were employed for the desulfurization: a reaction temperature of about 750° F., a space velocity of 2.0 volumes of feed stock per volume of catalyst per hour, a pressure of 150 lbs. per. sq. in. gauge, an operating cycle of six hours, and 3000 cu. ft. of added hydrogen per barrel of feed. The product from each of the runs was processed in the manner described in Example I. The following data are obtained:

| Catalyst number | 1 | 2 | 3 |
|---|---|---|---|
| Method of impregnation | Ni+Mo | Ni 1st, Mo 2nd. | Mo 1st, Ni 2nd. |
| Composition: | | | |
| MoO₃, weight percent | 9.0 | 9.6 | 9.2. |
| NiO, weight percent | 4.5 | 4.5 | 4.3. |
| Examination of product: | | | |
| Liquid recovery, volume percent. | 97 | 98 | 98. |
| Sulfur in product, weight percent. | 0.32 | 0.31 | 0.27. |

Highly active desulfurization catalysts are prepared by impregnating the carrier in two separate stages wherein the molybdenum is deposited in the first impregnation stage and nickel is deposited in the second. The two-stage impregnated catalysts, wherein the MoO₃ is deposited first and the NiO second, are superior to the single stage coimpregnated catalysts in that they give a higher yield of liquid product and the products are richer in aromatics.

*Example IV*

Catalysts 1, 2 and 3 prepared as described in Example III were also tested for the hydroforming of a naphthene-rich straight run distillate having an API gravity of 52.7 and containing about 12.7 volumes per cent aromatics. The following conditions are employed: A process period of four hours, a space velocity of 1.0 volumes of feed stock per volume of catalyst per hour, a pressure of 100 lbs., an isothermal block temperature of 950° F. (temperature of large steel block surrounding the reactor tube) and 300 cu. ft. of fresh added hydrogen per barrel of feed. The products of the runs are analyzed for aromatic content and the amount of synthetic aromatics is calculated by assuming that the aromatics originally present in the feed stock passes through the reactor unchanged and are completely recovered in the products. The hydroforming data for synthetic aromatics are shown as follows:

| Catalyst number | 1 | 2 | 3 |
|---|---|---|---|
| Method of impregnation | Ni+Mo | Ni 1st, Mo 2nd. | Mo 1st, Ni 2nd. |
| Synthetic aromatics, volume percent of feed. | 29 | 29.5 | 32. |

The foregoing disclosure of this invention is not to be considered as limiting since many variations may be made by those skilled in the art without departing from the scope or spirit of the following claims.

I claim:
1. A process for the catalytic conversion of mineral oil hydrocarbon stocks, which comprises passing said hydrocarbon stock in admixture with hydrogen through a catalyst contacting zone maintained at a temperature between about 600° and 1200° F. and a pressure between about atmospheric and 5000 p. s. i., said catalyst contacting zone containing a catalyst consisting essentially of a minor proportion of nickel oxide plus molybdenum oxide and a major proportion of an adsorbent carrier, said catalyst having been prepared by first impregnating an adsorbent carrier which is essentially alumina with an aqueous solution of a molybdenum compound, heating the once-impregnated carrier at an activation temperature above about 400° C. to thereby activate the alumina and decompose said molybdenum compound to the oxide form thereafter impregnating said carrier with an aqueous solution of a nickel compound and heating the twice-impregnated carrier at an activation temperature above about 400° C. to thereby activate the alumina and decompose said nickel compound to the oxide form.

2. A process for the desulfurization of mineral oil hydrocarbon stocks which comprises passing said hydrocarbon stock in admixture with hydrogen through a catalyst contacting zone maintained at a temperature between about 600° and 1000° F. and a pressure between about atmospheric and 5000 p. s. i., said catalyst contacting zone containing a catalyst consisting essentially of a minor proportion of nickel oxide plus molybdenum oxide and a major proportion of an adsorbent carrier, said catalyst having been prepared by first impregnating an adsorbent carrier which is essentially alumina with an aqueous solution of a molybdenum compound, heating the once-impregnated carrier at an activation temperature above about 400° C. to thereby activate the alumina and decompose said molybdenum compound to the oxide form, thereafter impregnating said carrier with an aqueous solution of a nickel compound, and heating the twice-impregnated carrier at an activation temperature above about 400° C. to thereby activate the alumina and decompose said nickel compound to the oxide form.

3. A process as defined in claim 2 wherein said catalyst comprises between about 7% and 22% by weight of the oxides of nickel and molybdenum and said carrier is alumina-silica containing between about 3% and 8% by weight of SiO₂.

4. A process for the hydroforming of mineral oil hydrocarbon stocks which comprises passing said hydrocarbon stock in admixture with hydrogen through a catalyst contacting zone maintained at a temperature between about 800° and 1200° F. and a pressure between about 50 and 1000 p. s. i., said catalyst contacting zone containing a catalyst consisting essentially of a minor proportion of nickel oxide plus molybdenum oxide and a major proportion of an adsorbent carrier, said catalyst having been prepared by first impregnating an adsorbent carrier which is essentially alumina with an aqueous solution of a molybdenum compound, heating the once-impregnated carrier at an activation temperature above about 400° C. to thereby activate the alumina and decompose said molybdenum compound to the oxide form, thereafter impregnating said carrier with an aqueous solution of a nickel compound, and heating the twice-impregnated carrier at an activation temperature above about 400° C. to thereby activate the alumina and decompose said nickel compound to the oxide form.

5. A process as defined in claim 4 wherein said catalyst comprises between about 7% and 22% by weight of the oxides of nickel and molybdenum and said carrier is alumina-silica containing between about 3% and 8% by weight of $SiO_2$.

References Cited in the file of this patent

UNITED STATES PATENTS

| Number | Name | Date |
|---|---|---|
| 2,393,288 | Byrns | Jan. 22, 1946 |
| 2,411,829 | Huffman | Nov. 26, 1946 |
| 2,486,361 | Nahin et al. | Oct. 25, 1949 |
| 2,499,255 | Parker | Feb. 28, 1950 |